(12) United States Patent
Wermuth et al.

(10) Patent No.: US 9,127,637 B2
(45) Date of Patent: Sep. 8, 2015

(54) METHOD FOR MANAGING TRANSITIONS IN INTERNAL COMBUSTION ENGINES WITH COMBUSTION PHASING

(75) Inventors: Nicole Wermuth, Garching Bei München (DE); Paul M. Najt, Bloomfield Hills, MI (US); Hanho Yun, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1164 days.

(21) Appl. No.: 13/098,579

(22) Filed: May 2, 2011

(65) Prior Publication Data

US 2011/0283971 A1    Nov. 24, 2011

Related U.S. Application Data

(60) Provisional application No. 61/347,796, filed on May 24, 2010.

(51) Int. Cl.
| | |
|---|---|
| *F01L 1/36* | (2006.01) |
| *F02P 5/00* | (2006.01) |
| *F02P 5/04* | (2006.01) |
| *F02B 1/12* | (2006.01) |
| *F02D 41/30* | (2006.01) |
| *F02D 41/00* | (2006.01) |

(52) U.S. Cl.
CPC . *F02P 5/045* (2013.01); *F02B 1/12* (2013.01); *F02D 41/307* (2013.01); *F02D 41/3041* (2013.01); *F02D 41/3047* (2013.01); *F02D 2041/001* (2013.01); *Y02T 10/128* (2013.01)

(58) Field of Classification Search
CPC .......... F02D 41/3035; F02D 2041/001; F02D 13/0265; F02D 13/0207; F02D 41/3064; F02D 41/3041; F02B 1/12; Y02T 10/18; Y02T 10/128
USPC ........ 123/90.15, 90.16, 90.17, 295, 305, 345, 123/346, 347, 348, 443, 406.11, 406.12
See application file for complete search history.

(56) References Cited

U.S. PATENT DOCUMENTS

| | | | |
|---|---|---|---|
| 6,386,177 B2 * | 5/2002 | Urushihara et al. | 123/299 |
| 6,953,409 B2 | 10/2005 | Shmidt et al. | |
| 6,994,072 B2 | 2/2006 | Kuo et al. | |
| 7,128,047 B2 | 10/2006 | Kuo et al. | |
| 7,152,559 B2 | 12/2006 | Kuo et al. | |
| 7,275,514 B2 | 10/2007 | Kuo et al. | |
| 7,370,616 B2 * | 5/2008 | Kuo et al. | 123/90.15 |
| 2006/0016438 A1 | 1/2006 | Kang | |

(Continued)

FOREIGN PATENT DOCUMENTS

CN    101532446 A    9/2009

*Primary Examiner* — Mahmoud Gimie
*Assistant Examiner* — Sizo Vilakazi (57) ABSTRACT

A combustion mode transition control for controlling a transition between a homogeneous-charge compression-ignition (HCCI) combustion mode and a spark-ignition (SI) combustion mode includes slowly transitioning intake and exhaust camshafts from initial phase settings corresponding to one of the HCCI and SI combustion modes to target phase settings corresponding to the other of the HCCI and SI combustion modes. An ignition spark timing and an injected fuel mass are coordinated with the transitioning of the intake and exhaust camshaft phase settings to substantially maintain engine load continuity during the transitioning of the intake and exhaust camshaft phase settings.

3 Claims, 4 Drawing Sheets

(56) References Cited

U.S. PATENT DOCUMENTS

| | | |
|---|---|---|
| 2008/0066713 A1* | 3/2008 | Megli et al. .................... 123/295 |
| 2008/0173265 A1* | 7/2008 | Sandquist et al. ......... 123/90.15 |
| 2009/0234560 A1* | 9/2009 | Rayl et al. ..................... 701/103 |
| 2009/0259387 A1* | 10/2009 | Kakuya et al. ................ 701/103 |
| 2010/0242902 A1* | 9/2010 | Kang et al. .................... 123/305 |
| 2011/0283972 A1* | 11/2011 | Wermuth et al. ........ 123/406.12 |
| 2013/0174805 A1* | 7/2013 | Bayer et al. ................... 123/295 |

* cited by examiner

METHOD FOR MANAGING TRANSITIONS IN INTERNAL COMBUSTION ENGINES WITH COMBUSTION PHASING

CROSS REFERENCE TO RELATED APPLICATIONS

This application claims the benefit of U.S. Provisional Application No. 61/347,796, filed on May 24, 2010, which is incorporated herein by reference.

TECHNICAL FIELD

This disclosure relates to an engine operable in two discrete combustion modes.

BACKGROUND

The statements in this section merely provide background information related to the present disclosure and may not constitute prior art.

Known spark-ignition (SI) engines introduce an air/fuel mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

SI engines can operate in a variety of different combustion modes, including a homogeneous charge SI combustion mode and a stratified-charge SI combustion mode. SI engines can be configured to operate in a homogeneous-charge compression-ignition (HCCI) combustion mode, also referred to as controlled auto-ignition combustion, under predetermined speed/load operating conditions. The HCCI combustion mode includes a distributed, flameless, auto-ignition combustion process that is controlled by oxidation chemistry. An engine operating in the HCCI combustion mode has a cylinder charge that is preferably homogeneous in composition, temperature, and residual exhaust gases at intake valve closing time. HCCI combustion is a distributed kinetically-controlled combustion process with the engine operating at a dilute air/fuel mixture, i.e., lean of a stoichiometric air/fuel point, with relatively low peak combustion temperatures, resulting in low NOx emissions. The homogeneous air/fuel mixture minimizes occurrences of rich zones that form smoke and particulate emissions.

In engine operation, the engine airflow is controlled by selectively adjusting position of the throttle valve, controlling an external exhaust gas recirculation (EGR) flow, and opening and closing of intake valves and exhaust valves. On engine systems so equipped, opening and closing of the intake valves and exhaust valves can be adjusted using a variable valve actuation system that includes variable cam phasing and a selectable multi-step valve lift, e.g., multiple-step cam lobes which provide two or more valve lift positions. In contrast to the throttle position change which is substantially continuous, the change in valve position of the multi-step valve lift mechanism is a discrete change.

When an engine operates in a HCCI combustion mode, the engine operates at a lean or stoichiometric air/fuel ratio operation with the throttle wide open (WOT) to minimize engine pumping losses. When the engine operates in the SI combustion mode, the engine preferably operates with a stoichiometric air/fuel ratio, with the throttle valve controlled over a range of positions from 0% to 100% of the wide-open throttle position to control intake airflow to achieve the stoichiometric air/fuel ratio.

In an engine configured to operate in either SI or HCCI combustion modes, transitioning between combustion modes can be complex. The engine control module must coordinate actuations of multiple devices in order to provide a desired air/fuel ratio for the different modes. During a transition between a HCCI combustion mode and SI combustion mode, valve lift switching occurs nearly instantaneously, while adjustments to cam phasers and pressures in the manifold have slower dynamics. Until the desired air/fuel ratio is achieved, incomplete combustion and misfire can occur, leading to torque disturbances.

SUMMARY

A direct-injection internal combustion engine includes an intake camshaft with a low-lift intake cam and a high-lift intake cam, a variable lift control for selectively operating an intake valve in one of a low-lift intake valve profile with the low-lift intake cam and a high-lift intake valve profile with the high-lift intake cam, a variable cam phase control operative on the intake camshaft for simultaneously controlling phase settings of the low-lift intake cam and the high-lift intake cam, an exhaust camshaft with a low-lift exhaust cam and a high-lift exhaust cam, a variable lift control for selectively operating an exhaust valve in one of a low-lift exhaust valve profile with the low-lift exhaust cam and a high-lift exhaust valve profile with the high-lift exhaust cam, a variable cam phase control operative on the exhaust camshaft for simultaneously controlling phase settings of the low-lift exhaust cam and the high-lift exhaust cam, an ignition spark control, and a fuel injection control. A combustion mode transition control for controlling a transition between a homogeneous-charge compression-ignition (HCCI) combustion mode and a spark-ignition (SI) combustion mode includes slowly transitioning the intake and exhaust camshafts from initial phase settings corresponding to one of the HCCI and SI combustion modes to target phase settings corresponding to the other of the HCCI and SI combustion modes. An ignition spark timing and an injected fuel mass are coordinated with the transitioning of the intake and exhaust camshaft phase settings to substantially maintain engine load continuity during the transitioning of the intake and exhaust camshaft phase settings.

BRIEF DESCRIPTION OF THE DRAWINGS

One or more embodiments will now be described, by way of example, with reference to the accompanying drawings, in which.

DETAILED DESCRIPTION

Figure 1:
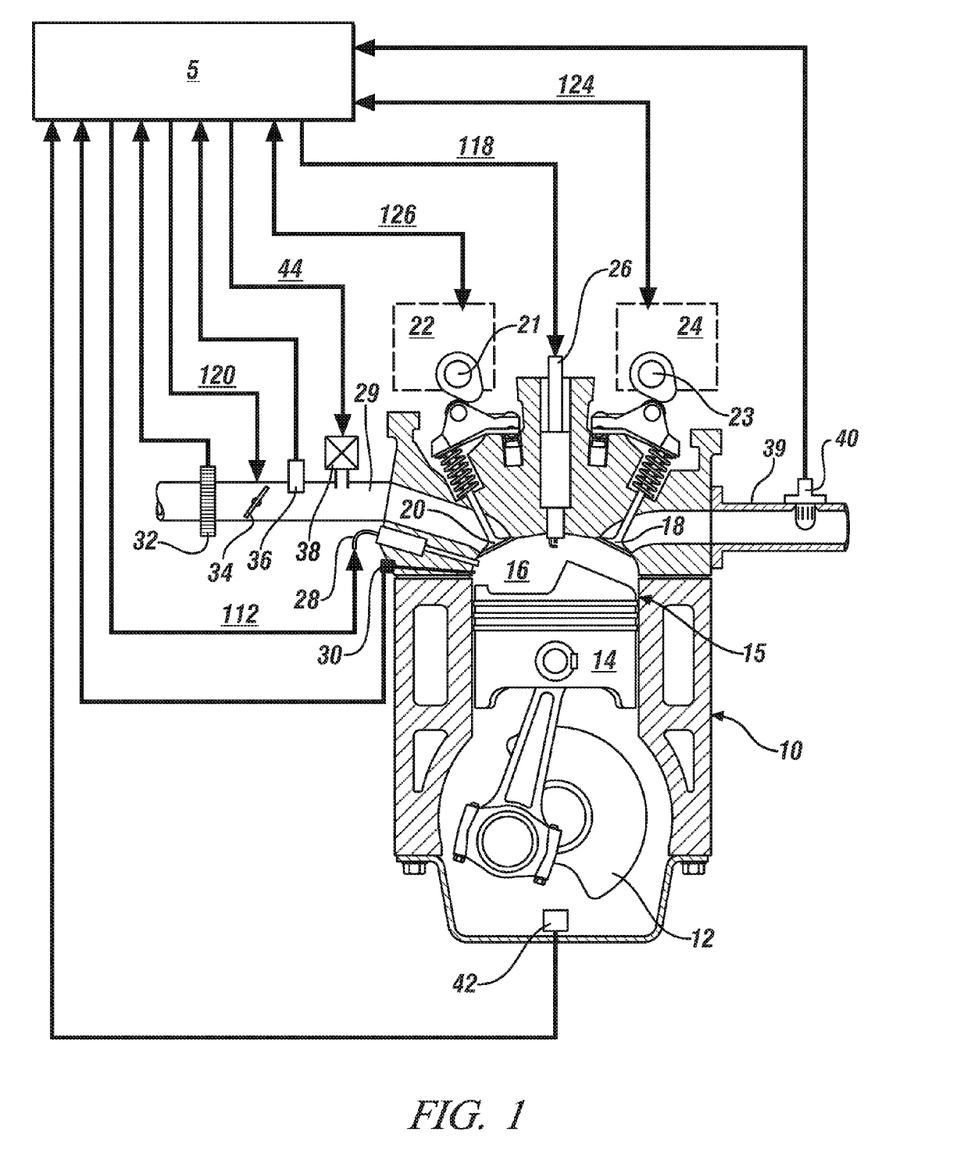
FIG. 1 is a schematic drawing of an internal combustion engine with an accompanying control module, in accordance with the present disclosure.

Referring now to the drawings, wherein the depictions are for the purpose of illustrating certain exemplary embodiments only and not for the purpose of limiting the same, FIG. 1 is a schematic drawing of an internal combustion engine 10 with an accompanying control module 5 that have been constructed in accordance with an embodiment of this disclosure. The engine 10 is selectively operative in a plurality of combustion modes, including a homogeneous-charge compression-ignition (HCCI) combustion mode and a spark-ignition (SI) combustion mode. The engine 10 is selectively operative at a stoichiometric air/fuel ratio and at an air/fuel ratio that is primarily lean of stoichiometry. The disclosure can be applied to various internal combustion engine systems and combustion cycles.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system has airflow ductwork and devices for monitoring and controlling the air flow. The air intake devices preferably include a mass airflow sensor 32 for monitoring mass airflow and intake air temperature. A throttle valve 34 preferably includes an electronically controlled device that is used to control airflow to the engine 10 in response to a control signal for throttle position 120 from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38 via a control signal 44.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift (VLC) of the intake valve(s) 20 and variably adjust and control phasing (VCP) of the intake camshaft 21 for each cylinder 15 in response to a control signal 126 from the control module 5. The exhaust VCP/VLC device 24 preferably includes a controllable mechanism operative to variably switch and control valve lift (VLC) of the exhaust valve(s) 18 and variably adjust and control phasing (VCP) of the exhaust camshaft 23 for each cylinder 15 in response to a control signal for exhaust valve lift 124 from the control module 5.

The intake and exhaust VCP/VLC devices 22 and 24 each preferably includes a controllable two-step VLC mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for low speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, in response to the respective control signals for exhaust and intake lift and phase 124 and 126, respectively.

The engine 10 has a fuel injection system, including a plurality of high-pressure fuel injectors 28 each configured to directly inject a mass of fuel into one of the combustion chambers 16 in response to a control signal for injected fuel mass 112 from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a control signal for ignition timing 118 from the control module 5.

The engine 10 is equipped with various sensing devices for monitoring engine operation, including a crank sensor 42 having output RPM and operative to monitor crankshaft rotational position, i.e., crank angle and speed, a combustion sensor 30 configured to monitor combustion, and an exhaust gas sensor 40 configured to monitor exhaust gases, typically an air/fuel ratio sensor. The combustion sensor 30 has a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. However, combustion phasing may also be determined by similar methods as may be known by those skilled in the art. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, exhaust gas fractions, and non-intrusive cylinder pressure sensors.

In operation, the control module 5 monitors inputs from the aforementioned sensors to determine states of engine parameters. The control module 5 is configured to receive input signals from an operator (e.g., via an accelerator pedal and a brake pedal) to determine an operator torque request. The control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include negative valve overlap (NVO) and lift of exhaust valve reopening (in an exhaust re-breathing strategy) in one embodiment. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from the exhaust gas sensor 40.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

During engine operation in the HCCI combustion mode, the throttle valve 34 is preferably substantially wide-open (WOT), with the engine 10 controlled at a lean or stoichiometric air/fuel ratio. The intake and exhaust valves 20 and 18 are in the low-lift valve open position and the intake and exhaust lift timing operate with NVO. Substantially wide-open throttle can include operating fully un-throttled, or slightly throttled to create a vacuum in the intake manifold 29 to effect EGR flow. In one embodiment, in-cylinder EGR mass is controlled to a high dilution rate, e.g., greater than 40% of cylinder air charge. One or more fuel injection events can be executed during an engine cycle.

During engine operation in the homogeneous spark-ignition (SI) combustion mode, the throttle valve 34 is controlled to regulate the air flow. The engine 10 is controlled to a stoichiometric air/fuel ratio, and the intake and exhaust valves 20 and 18 are in the high-lift valve open position and the intake and exhaust lift timing operate with PVO. Preferably, a fuel injection event is executed during intake or compression phase of an engine cycle, preferably substantially before TDC. Spark-ignition is preferably discharged at a predetermined time subsequent to the fuel injection when air charge within the cylinder is substantially homogeneous.

The control module 5 transitions engine operation to a preferred combustion mode associated with operating the engine 10 in the HCCI combustion mode or SI combustion mode to increase fuel efficiencies and engine stability, and/or decrease emissions. A change in one of the engine parameters, e.g., speed and load, can effect a change in an engine operating zone. The control module 5 commands a change in the preferred combustion mode associated with a change in the engine operating zone.

During combustion mode transitions, the engine 10 is controlled to operate at a preferred air/fuel ratio and the intake airflow and fuel injection are controlled to achieve the preferred air/fuel ratio associated with the selected combustion mode. This includes estimating a cylinder air charge based upon engine operation in the selected combustion mode. The throttle valve 34 and intake and exhaust VCP/VLC devices 22 and 24 are controlled to achieve an intake air flowrate based upon the estimated cylinder air charge, including during a transition between the SI and HCCI combustion modes. Airflow is controlled by adjusting the throttle valve 34 and the intake and exhaust VCP/VLC devices 22 and 24 to control the opening timing and lift profiles of the intake and exhaust valve(s) 20 and 18. Operations in the two combustion modes requires different settings for the intake and exhaust VCP/VLC devices 22 and 24 in terms of valve phase and lift of the intake and exhaust valve(s) 20 and 18 and the throttle valve 34 for throttle position.

During a transition from the SI combustion mode to the HCCI combustion mode, the engine 10 transitions to operate at a lean or stoichiometric air/fuel ratio and the airflow is controlled to achieve the preferred air/fuel ratio. The control module 5 controls the throttle 34 to open to a predetermined position and commands the intake and exhaust VCP/VLC systems 22 and 24 to adjust the intake and exhaust cam phase settings to a relatively minor NVO of the low-lift valve profiles, thereby increasing manifold pressure. The intake and exhaust cam phase settings to the relatively minor NVO of the low-lift valve profiles corresponds to the intake and exhaust cam phase settings to a relatively minor PVO of the high-lift valve profiles. Airflow subsequently increases due to the increasing manifold pressure until the VLC portion of the intake and exhaust VCP/VLC systems 22 and 24 switches the intake and exhaust valves 20 and 18 from the high-lift valve open position to the low-lift valve open position. Fuel mass corresponds to engine load during operation in HCCI.

During a transition from the HCCI combustion mode to the SI combustion mode, the engine 10 is transitioned to operate at the stoichiometric air/fuel ratio. The control module 5 controls the throttle 34 to a predetermined position and controls the intake and exhaust VCP/VLC systems 22 and 24 to adjust the intake and exhaust cam phase settings to the relatively minor PVO of the high-lift valve profiles, thereby decreasing manifold pressure while switching the intake and exhaust valves 20 and 18 from the low-lift valve open position to the high-lift valve open position, thereby increasing airflow. The intake and exhaust cam phase settings to the relatively minor PVO of the high-lift valve profiles corresponds to the intake and exhaust cam phase settings to the relatively minor NVO of the low-lift valve profiles.

Certain engine actuators are known to have a fast dynamic response (known as fast engine actuators), and can adjust to a new commanded output within a single engine cycle or cylinder event. The fast engine actuators include, e.g., fuel injectors, spark igniters, and valve lift mechanisms (such as two-step valve lift mechanisms). Other engine actuators are slower to effect a change in response to a control signal (known as slow engine actuators), and take multiple engine cycles or cylinder events to adjust to a new commanded output due to component inertias, mechanical response times, and airflow lags. The slow engine actuators include, e.g., EGR valve, throttle, and valve phasers. Since combustion phasing is primarily driven by spark timing, combustion phasing is also considered to have a fast dynamic response. The term slow and its variants as related to engine actuators and control or response thereof as used herein means over multiple engine cycles or cylinder events. Similarly, the term fast and its variants as related to engine actuators and control or response thereof as used herein means over a single engine cycle or cylinder event.

Figure 2:
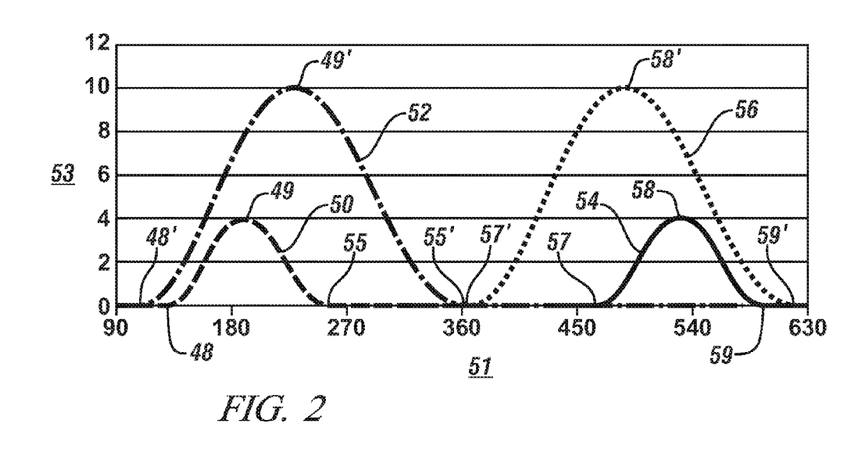
FIG. 2 graphically illustrates valve lift in relation to piston position, including exemplary exhaust cam low-lift and high-lift valve profiles and intake cam low-lift and high-lift valve profiles during low load operation of the exemplary engine, in accordance with the present disclosure.

FIG. 2 graphically illustrates valve lift 53, in millimeters, with relation to crank angle degrees 51, including an exemplary exhaust cam low-lift valve profile 50 and a high-lift valve profile 52 and an intake cam low-lift valve profile 54 and a high-lift valve profile 56 during low load operation of the exemplary engine 10. The low-lift valve profiles for the exhaust cam 50 and the intake cam 54 correspond to operation in the HCCI combustion mode. The high-lift valve profiles for the exhaust cam 52 and the intake cam 56 correspond to operation in the SI combustion mode. The exhaust cam low-lift profile 50 begins opening at point 48, reaches maximum lift at point 49, and completely closes at point 55. The exhaust cam high-lift profile 52 begins opening at point 48', reaches maximum lift at point 49', and completely closes at point 55'. The intake cam low-lift cam profile 54 begins opening at point 57, reaches maximum lift at point 58, and completely closes at point 59. The intake cam high-lift cam profile 56 begins opening at point 57', reaches maximum lift at point 58', and completely closes at 59'. The exhaust cam and intake cam profiles depict a maximum negative valve overlap in each of the exemplary HCCI combustion mode and the SI combustion mode in one embodiment. One of ordinary skill in the art understands that the exemplary cam profiles are one of many combinations capable of being utilized and are not meant to be inclusive of all the potential cam profile combinations.

Figure 3:
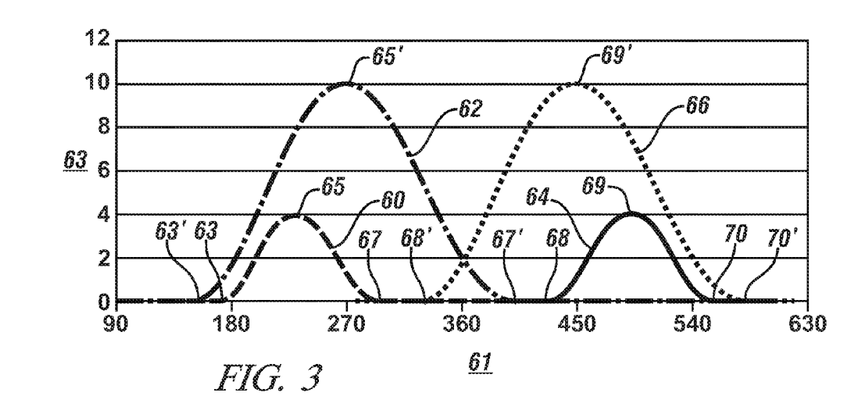
FIG. 3 graphically illustrates valve lift in relation to piston position, including exemplary exhaust cam low-lift and high-lift valve profiles and intake cam low-lift and high-lift valve profiles during high load operation of the exemplary engine, in accordance with the present disclosure.

FIG. 3 graphically illustrates valve lift 63, in millimeters, in relation to crank angle degrees 61, including an exemplary exhaust cam low-lift valve profile 60 and a high-lift valve profile 62 and an intake cam low-lift valve profile 64 and a high-lift valve profile 66 during high load operation of the exemplary engine 10. The low-lift valve profiles for the exhaust cam 60 and the intake cam 64 correspond to operation in the HCCI combustion mode. The high-lift valve profiles for the exhaust cam 62 and the intake cam 66 correspond to operation in the SI combustion mode. The exhaust cam low-lift profile 60 is retarded, as compared to that shown in FIG. 2, under high load operation and begins opening at point 63 reaches maximum lift at point 65 and completely closes at point 67. The exhaust cam high-lift profile 62 is also retarded by the same amount as the low-lift cam profile 60 and begins opening at point 63' reaches maximum lift at point 65' and completely closes at point 67'.

The intake cam low-lift cam profile 64 is advanced, as compared to that shown in FIG. 2, under high load operation and begins opening at point 68 reaches maximum lift at point 69 and completely closes at point 70. The intake cam high-lift cam profile 66 is also advanced by the same amount as the low-lift cam profile 64 and begins opening at point 68' reaches maximum lift at point 69' and completely closes at 70'. The exhaust cam profile represents the minimum negative valve overlap achieved in the exemplary HCCI combustion mode in one embodiment. The intake cam profile represents the maximum positive valve overlap achieved in the exemplary SI combustion mode. It is appreciated that the exemplary cam profiles are one of many combinations capable of being utilized and are not meant to be inclusive of the potential cam profile combinations. It is appreciated the changes in phasing of the intake and exhaust cam profiles are continuous with change in load and are modified according to requested engine load and engine efficiencies. One of ordinary skill in the art will recognize the cam profile phasing is illustrative and can be varied depending upon operational parameters such as audible combustion noise, airflow, and fuel efficiency for a specific application.

Figure 4:
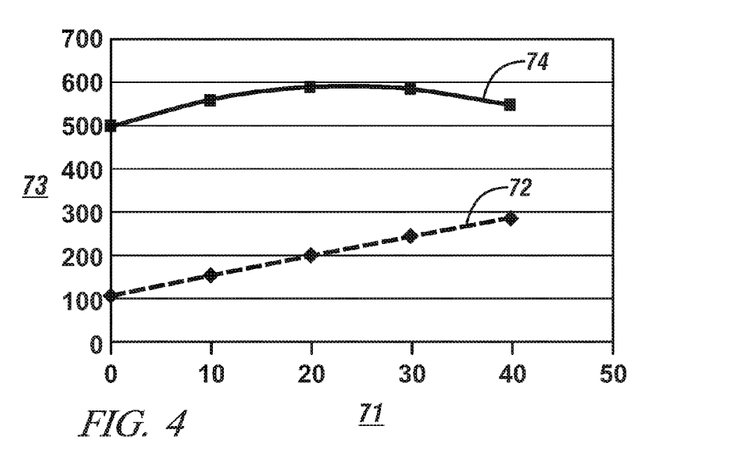
FIG. 4 graphically depicts air mass flow into each cylinder in relation to cam phasing angle for high-lift and low-lift cam profiles, in accordance with the present disclosure.

FIG. 4 graphically depicts an in-cylinder air mass 73, in milligrams, into each cylinder correlated to cam phasing angle 71 represented by crank angle degrees with respect to FIGS. 2 and 3. The left of the graph depicts airflow for the low-lift and high-lift cam profiles 72, 74, respectively, when the engine is operating in low-load, e.g., FIG. 2. The right of the graph depicts airflow for the cam profiles when the engine is operating in high-load, e.g., FIG. 3. As the engine load increases, the amount of cam phasing increases thereby flowing more air mass into each cylinder. In HCCI combustion, the low-lift cam profile 72 is used. When the low-lift cam profile 72 reaches the high load engine operation, the cam profiles switch from the low-lift cam profile 72 to the high-lift cam profile 74 to operate in the low-load SI combustion mode. The difference of airflow between the low-lift and high-lift cam profiles 72, 74, respectively, is substantial, moving from approximately 300 mg to approximately 500 mg. A near stoichiometric air/fuel mixture is desirable in the SI combustion mode and hence the switch from low-lift cam profile to high-lift cam profile together with a near stoichiometric air/fuel mixture would create a higher load discontinuity or disruption and lower combustion noise discontinuity or disruption.

Figure 5:
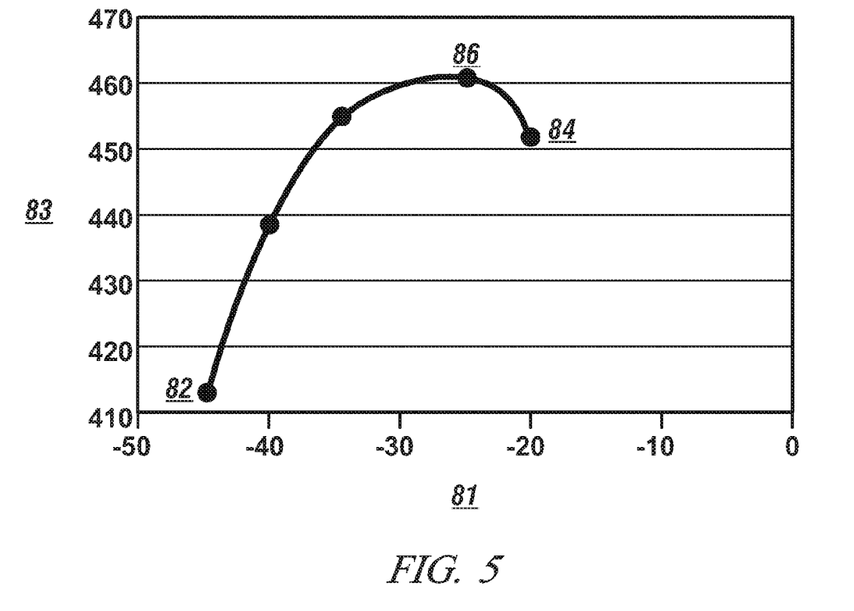
FIG. 5 graphically illustrates engine load in relation to ignition timing at a fixed operating point in the SI combustion mode, in accordance with the present disclosure.

FIG. 5 graphically illustrates engine load 83, in NMEP, as a function of ignition timing 81, in degrees after top dead center (aTDC), at a fixed operating point in the SI combustion mode. The graph indicates a trend of engine load as the ignition timing is advanced from point 84 to point 82 along the curve. A peak output torque point exists at point 86 with ignition timing approximately −25 degrees aTDC. The peak output torque point 86 is the point at which the torque for a given set of engine operating parameters is the highest capable output. When the ignition timing advances beyond the peak output torque point 86, engine load reduces. Advancing the ignition beyond the timing which produces maximum load (i.e. from point 86 to point 82) is referred to as over-advancing ignition timing and results in over-advancing combustion phasing and decreasing engine load.

Figure 6:
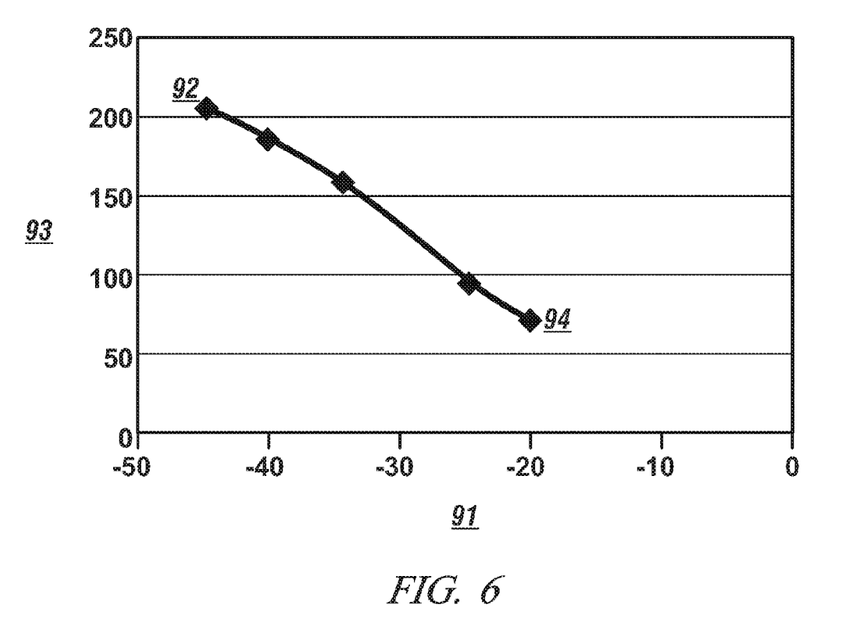
FIG. 6 graphically illustrates maximum in-cylinder pressure rise rate in relation to ignition timing at a fixed operating point in the SI combustion mode, in accordance with the present disclosure.

FIG. 6 graphically illustrates data indicating maximum in-cylinder pressure rise rate 93, in kilopascals per crank angle degree, as a function of ignition timing 91, in degrees aTDC. Maximum pressure rise rate is an indicator of audible combustion noise. The higher the rate, the more audible combustion noise is generated. Therefore the audible combustion noise level shows a significant increase from point 94 to point 92. Point 92 and point 94 of FIG. 6 correspond to the same ignition timing as points 82 and 84, respectively, of FIG. 5. Therefore, point 92 of FIG. 6 and point 82 of FIG. 5 represent a low engine load and a high audible combustion noise level, whereas point 94 of FIG. 6 and point 84 of FIG. 5 represent a high engine load and a low audible combustion noise level.

An over-advanced combustion phasing reduces engine load 83 and increases audible combustion noise 93 when operating in the SI combustion mode. Each cylinder may be varied independently to provide levels of engine load and audible combustion noise levels that are similar to a transitioned HCCI combustion mode. Therefore, a combustion mode transition may be effected through switching ignition timing and engine fueling without torque disturbances or a large variation in audible combustion noise resulting in a smooth transition from one combustion mode to the other. The combustion phasing and engine fueling may also be controllably adjusted together in coordination with the slow engine actuators response (i.e. the VCP portion of the VCP/VLC devices 22, 24, and throttle valve 34) and provide corresponding changes in engine load and combustion noise levels.

Figure 7:
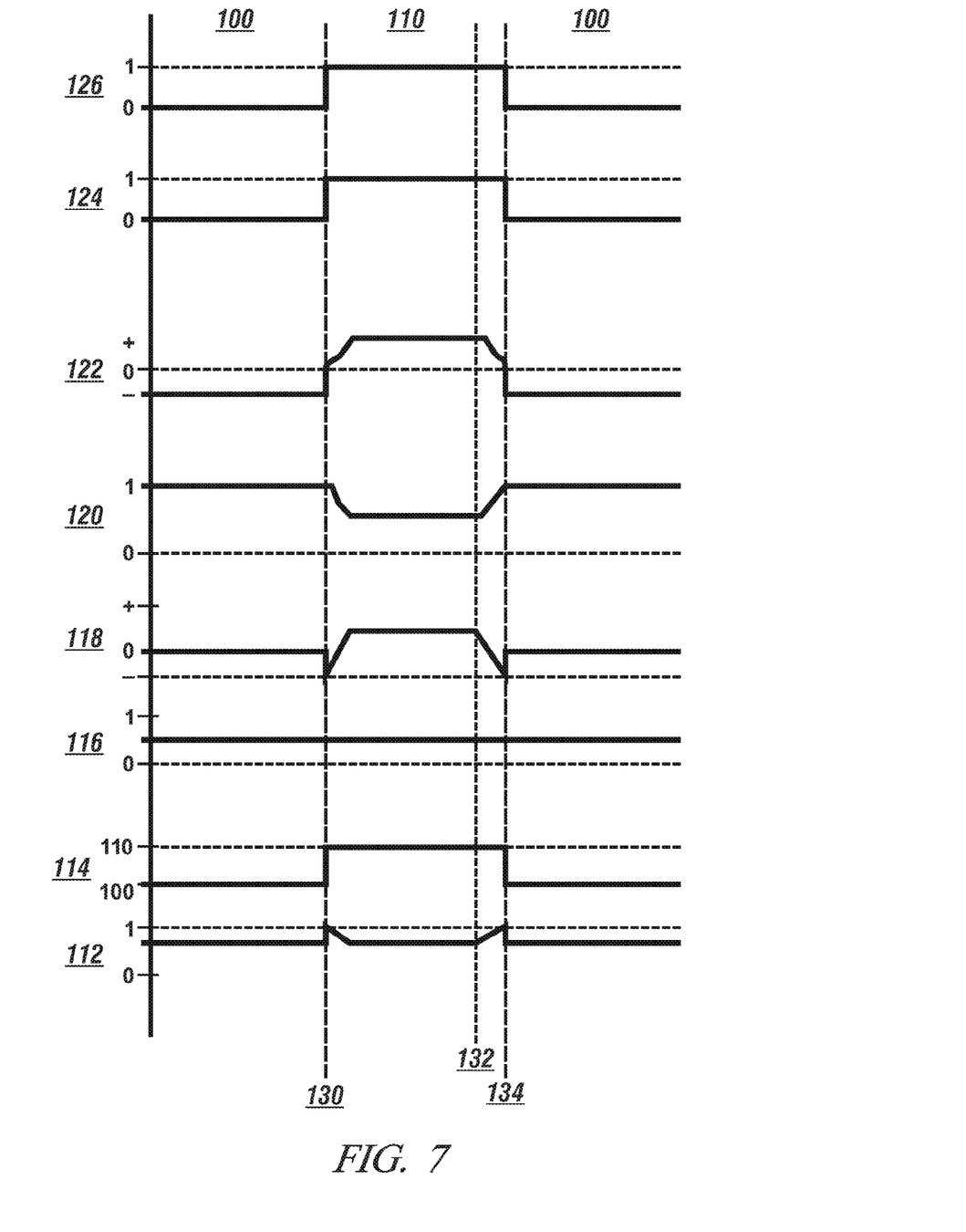
FIG. 7 graphically illustrates states of engine control parameters during combustion mode transitions, including injected fuel mass, combustion mode, torque, ignition timing, throttle position, valve overlap, and intake and exhaust valve lift, in accordance with the present disclosure.

FIG. 7 graphically illustrates states of engine actuators and associated engine parameters during combustion mode transitions, including injected fuel mass 112, combustion mode 114, torque 116, ignition timing 118, throttle position 120, valve overlap 122, and exhaust and intake valve lift 124 and 126, respectively. The engine 10 is initially operating in the HCCI combustion mode 100. During the HCCI combustion mode 100, the control module 5 commands a transition to the SI combustion mode 110, for example at time 130, when predetermined conditions are met. Predetermined conditions that may cause a commanded change in combustion modes include, for example, engine load and speed being outside or trending out of a predetermined operating range associated with the present combustion mode (i.e. a high load HCCI limit or a low load SI limit). The control module 5 determines the current operating torque and audible combustion noise levels. The control module 5 may use sensor data or look-up tables to determine the torque levels and combustion noise levels, or other suitable means. Similarly, during the SI combustion mode 110, the control module 5 commands a transition to the HCCI combustion mode 100, for example at time 132, when predetermined conditions are met.

Transition from the HCCI combustion mode 100 to the SI combustion mode 110 commences at time 130 of FIG. 7. The fast engine actuators, i.e., the fuel injectors 28 and the VLC portion of the intake and exhaust VCP/VLC devices 22, 24, fast switch to fuel injection and valve profiles corresponding to the SI combustion mode. The intake and exhaust VCP/VLC devices 22, 24 fast switch the intake and exhaust valves from the low-lift valve profiles (0) to high-lift valve profiles (1) thus causing the switch from the relatively minor NVO of the low-lift valve profiles (substantially at the HCCI high load limit cam phasing corresponding to FIG. 3) to the relatively minor PVO of the high-lift valve profiles at the same camshaft phase setting. At the same time and substantially coincident with the fast switching of the intake and exhaust valve profiles, injected fuel mass 112 is step-wise increased (i.e fast switched) to a near stoichiometric air/fuel in accordance with the significantly increased airflow corresponding to the high-lift valve profiles, and the spark-ignition system controls ignition timing 118 in step-wise fashion (i.e fast switched) to an over-advanced setting to control combustion phasing to substantially maintain engine load and combustion noise continuity at the fast switching of the intake and exhaust valve profiles. The injected fuel mass and the spark-ignition for each cylinder may be individually controlled in this manner to achieve the overall desired level of combustion noise and torque for the engine. Thus, the engine initially operates in the SI combustion mode with an over-advance of the ignition timing in at least one cylinder to control the torque output and audible combustion noise such that initial SI combustion mode operation is similar to that achieved when operating in the HCCI combustion mode just prior to the fast switch the intake and exhaust valve profiles. Controlling the combustion phasing therefore enables a substantially immediate transition without torque or audible combustion noise disturbances. One or more of the slow engine actuators, i.e., the VCP portion of the VCP/VLC devices 22, 24, and throttle valve 34, slowly transition to SI combustion mode settings beginning substantially coincident with the fast switch of the intake and exhaust valve profiles. Thus, throttle position 120 may slowly transition from WOT(1) to a SI combustion mode setting and valve profile overlap 122 slowly transitions from the relatively minor PVO of the high-lift valve profile to a relatively greater PVO of the high-lift valve profile. These slow transitions of the slow engine actuators occur in accordance with a significantly longer time constant than that corresponding to the fast engine actuators. Thus, ignition timing 118 is slowly retarded, and the injected fuel mass 112 is slowly reduced, to respective final desired SI combustion mode settings in coordination with the slow transitions of the slow engine actuators and corresponding time constant to substantially maintain engine load continuity during the transitioning of the intake and exhaust camshaft phase settings.

Transition from the SI combustion mode 110 to the HCCI combustion mode 100 commences at time 132 of FIG. 7. The control module 5 predicts the operating torque and audible combustion noise levels for the HCCI combustion mode 100 after the transition. The control module 5 can use sensor data or look-up tables to determine the HCCI combustion mode 100 torque levels and combustion noise levels after the transition. In the transition from SI combustion mode 110 to HCCI combustion mode 100, the slow engine actuators slowly transition in accordance with the slow engine actuator time constant before the fast engine actuators fast switch. One or more of the slow engine actuators, i.e., the VCP portion of the VCP/VLC devices 22, 24, and throttle valve 34, slowly transition to HCCI combustion mode settings prior to fast switch of the intake and exhaust valve profiles. Thus, throttle position 120 may slowly transition from WOT(1) to a SI combustion mode setting and valve profile overlap 122 slowly transitions from the relatively greater PVO of the high-lift valve profile to the relatively minor PVO of the high-lift valve profile. These slow transitions of the slow engine actuators occur in accordance with a significantly longer time constant than that corresponding to the fast engine actuators. Ignition timing 118 is slowly advanced to an over-advanced setting, and the injected fuel mass 112 is slowly increased, in coordination with the slow transitions of the slow engine actuators and corresponding time constant to substantially maintain engine load continuity during the transitioning of the intake and exhaust camshaft phase settings. The over-advance of the ignition timing and resultant over-advance of the combustion phasing provides a reduced amount of engine torque per unit fuel and an increase in audible combustion noise to provide a similar engine torque and audible combustion noise level as predicted for operation in the HCCI combustion mode 100. The combustion phasing for each cylinder 15 may be controlled individually so that the torque and audible combustion noise output can be synchronized across a variety of operating ranges, e.g., engine loads and audible combustion noise levels. Advancing the combustion phasing therefore provides conditions for a transition that minimizes torque or audible combustion noise disturbances. Once the slow engine actuators (and coordinated ignition timing and injected fuel mass) have achieved their target settings suitable for transitioning to the HCCI combustion mode, the fast engine actuators are fast switched. The intake and exhaust VCP/VLC devices 22, 24 fast switch the intake and exhaust valves from the high-lift valve profiles (1) to low-lift valve profiles (0) thus causing the switch from the relatively minor PVO of the high-lift valve profiles to the relatively minor NVO of the low-lift valve profiles (substantially at the HCCI high load limit cam phasing corresponding to FIG. 3) at the same camshaft phase setting. At the same time and substantially coincident with the fast switching of the intake and exhaust valve profiles, injected fuel mass 112 is step-wise decreased (i.e fast switched) in accordance with the significantly decreased airflow corresponding to the low-lift valve profiles, and the spark-ignition system controls ignition timing 118 in step-wise fashion (i.e fast switched) from the over-advanced setting to the final HCCI combustion mode setting to control combustion phasing to substantially maintain engine load and combustion noise continuity at the fast switching of the intake and exhaust valve profiles. The injected fuel mass and the spark-ignition for each cylinder may be individually controlled in this manner to achieve the overall desired level of combustion noise and torque for the engine. Thus, the engine initially operates in the SI combustion mode with an over-advance of the ignition timing in at least one cylinder to control the torque output and audible combustion noise such that initial HCCI combustion mode operation is similar to that achieved when operating in the SI combustion mode just prior to the fast switch the intake and exhaust valve profiles. Controlling the combustion phasing therefore enables a substantially immediate transition without torque or audible combustion noise disturbances.

Alternative embodiments may include other internal combustion engines having controllable multi-step valve opening control, including those employing multi-step valve openings and/or variable cam phasing for only the intake valves or the exhaust valves.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A combustion mode transition control method for controlling a transition between a homogeneous-charge compression-ignition (HCCI) combustion mode and a spark-ignition (SI) combustion mode in a direct-injection internal combustion engine including an intake camshaft with a low-lift intake cam and a high-lift intake cam, a variable lift control for selectively operating an intake valve in one of a low-lift intake valve profile with the low-lift intake cam and a high-lift intake valve profile with the high-lift intake cam, a variable cam phase control operative on the intake camshaft for simultaneously controlling phase settings of the low-lift intake cam and the high-lift intake cam, an exhaust camshaft with a low-lift exhaust cam and a high-lift exhaust cam, a variable lift control for selectively operating an exhaust valve in one of a low-lift exhaust valve profile with the low-lift exhaust cam and a high-lift exhaust valve profile with the high-lift exhaust cam, a variable cam phase control operative on the exhaust camshaft for simultaneously controlling phase settings of the low-lift exhaust cam and the high-lift exhaust cam, an ignition spark control, a fuel injection control, said transition control comprising:

slowly transitioning the intake and exhaust camshafts from initial phase settings corresponding to a first combustion mode comprising one of said HCCI and SI combustion modes to target phase settings corresponding to a second combustion mode comprising the other of said HCCI and SI combustion modes; and coordinating an ignition spark timing and an injected fuel mass with said transitioning of the intake and exhaust camshaft phase settings to substantially maintain engine load continuity during the transitioning of the intake and exhaust camshaft phase settings, the coordinating of the ignition spark timing comprising over-advancing ignition spark timing and then retarding ignition spark timing to a final desired combustion mode setting in the second combustion mode comprising the other of said HCCI and SI combustion modes;

wherein the first combustion mode comprises the HCCI combustion mode, the initial phase settings of the intake and exhaust camshafts comprise a negative overlap of the low-lift valve profiles, and the target phase settings of the intake and exhaust camshafts comprise a positive overlap of the high-lift valve profiles; the transition between the initial phase settings and the target phase settings of the intake and exhaust camshafts further comprising quickly transitioning to an intermediate positive overlap of the high-lift valve profiles less than the positive overlap of the high-lift valve profiles in the target phase settings, and then slowly transitioning from the intermediate positive overlap of the high-lift valve profiles to the target phase settings of the intake and exhaust camshafts.

2. A combustion mode transition control method for controlling a transition between a homogeneous-charge compression-ignition (HCCI) combustion mode and a spark-ignition (SI) combustion mode in a direct-injection internal combustion engine including an intake camshaft with a low-lift intake cam and a high-lift intake cam, a variable lift control for selectively operating an intake valve in one of a low-lift intake valve profile with the low-lift intake cam and a high-lift intake valve profile with the high-lift intake cam, a variable cam phase control operative on the intake camshaft for simultaneously controlling phase settings of the low-lift intake cam and the high-lift intake cam, an exhaust camshaft with a low-lift exhaust cam and a high-lift exhaust cam, a variable lift control for selectively operating an exhaust valve in one of a low-lift exhaust valve profile with the low-lift exhaust cam and a high-lift exhaust valve profile with the high-lift exhaust cam, a variable cam phase control operative on the exhaust camshaft for simultaneously controlling phase settings of the low-lift exhaust cam and the high-lift exhaust cam, an ignition spark control, a fuel injection control, said transition control comprising:

slowly transitioning the intake and exhaust camshafts from initial phase settings corresponding to a first combustion mode comprising one of said HCCI and SI combustion modes to target phase settings corresponding to a second combustion mode comprising the other of said HCCI and SI combustion modes;

coordinating an ignition spark timing and an injected fuel mass with said transitioning of the intake and exhaust camshaft phase settings to substantially maintain engine load continuity during the transitioning of the intake and exhaust camshaft phase settings, the coordinating of the ignition spark timing comprising over-advancing ignition spark timing and then retarding ignition spark timing to a final desired combustion mode setting in the second combustion mode comprising the other of said HCCI and SI combustion modes; and at the inception of transitioning of the intake and exhaust camshaft phase settings:

fast switching the effective intake and exhaust valve profiles from the respective low-lift valve profiles to the respective high-lift valve profiles;

fast switching the injected fuel mass to establish a predetermined air/fuel mixture at an intake airflow corresponding to the high-lift valve profiles and target phase settings of the intake and exhaust camshafts; and fast switching the ignition spark timing to an over-advanced setting sufficient in conjunction with said predetermined air/fuel mixture to substantially maintain engine load continuity across the switching of the effective intake and exhaust valve profiles and then slowly retarding the ignition spark timing to the final desired combustion mode setting;

wherein the first combustion mode comprises the HCCI combustion mode, the initial phase settings of the intake and exhaust camshafts comprise a negative valve overlap of the low-lift valve profiles, and the target phase settings of the intake and exhaust camshafts comprise a positive overlap of the high-lift valve profiles; the transition between the initial phase settings and the target phase settings of the intake and exhaust camshafts further comprising quickly transitioning to an intermediate positive overlap of the high-lift valve profiles less than the positive overlap of the high-lift valve profiles in the target phase settings, and then slowly transitioning from the intermediate positive overlap of the high-lift valve profiles to the target phase settings of the intake and exhaust camshafts.

3. A combustion mode transition control method for controlling a transition from a homogeneous-charge compression-ignition (HCCI) combustion mode to a spark-ignition (SI) combustion mode in a direct-injection internal combustion engine including an intake camshaft with a low-lift intake cam and a high-lift intake cam, a variable lift control for selectively operating an intake valve in one of a low-lift intake valve profile with the low-lift intake cam and a high-lift intake valve profile with the high-lift intake cam, a variable cam phase control operative on the intake camshaft for simultaneously controlling phase settings of the low-lift intake cam and the high-lift intake cam, an exhaust camshaft with a low-lift exhaust cam and a high-lift exhaust cam, a variable lift control for selectively operating an exhaust valve in one of a low-lift exhaust valve profile with the low-lift exhaust cam and a high-lift exhaust valve profile with the high-lift exhaust cam, a variable cam phase control operative on the exhaust camshaft for simultaneously controlling phase settings of the low-lift exhaust cam and the high-lift exhaust cam, an ignition spark control, a fuel injection control, said transition control comprising:

fast switching the effective intake and exhaust valve profiles from the respective low-lift valve profiles at a negative overlap to the respective high-lift valve profiles at a positive overlap;

fast switching the injected fuel mass to establish a predetermined air/fuel mixture at an intake airflow corresponding to the high-lift valve profiles and positive valve overlap;

fast switching the ignition spark timing to an over-advanced setting beyond a desired ignition spark timing for the SI combustion mode and sufficient in conjunction with said predetermined air/fuel mixture to substantially maintain engine load continuity across the switching of the effective intake and exhaust valve profiles; and at the completion of switching of the effective intake and exhaust valve profiles, the injected fuel mass, and the ignition spark timing:

slowly transitioning the intake and exhaust camshaft phase settings from a first positive overlap of the high-lift valve profiles to a second positive overlap of the high-lift valve profiles greater than the first positive overlap of the high-lift valve profiles; and coordinating an ignition spark timing retard to the desired ignition spark timing for the SI combustion mode and an injected fuel mass decrease with said transitioning of the intake and exhaust camshaft phase settings to substantially maintain engine load continuity during the transitioning of the intake and exhaust camshaft phase settings.

* * * * *